Jan. 19, 1943.　　　G. R. HERMAN　　　2,308,510
WELDING APPARATUS
Filed July 18, 1941　　　2 Sheets-Sheet 1
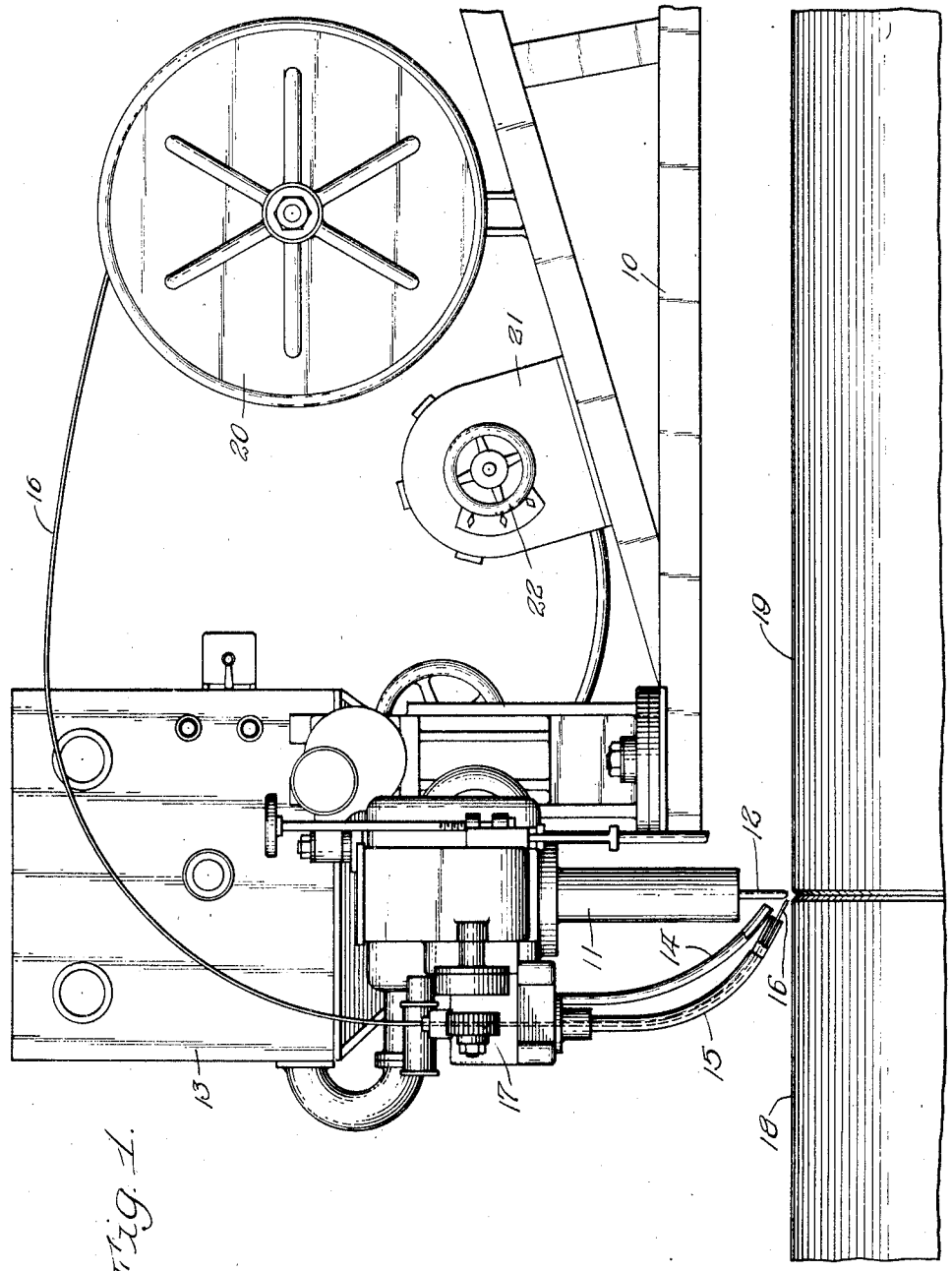
Inventor.
George R. Herman,
By Christy, Wiles, Davies & Hirschl,
Attys.

Jan. 19, 1943.  G. R. HERMAN  2,308,510
WELDING APPARATUS
Filed July 18, 1941  2 Sheets-Sheet 2
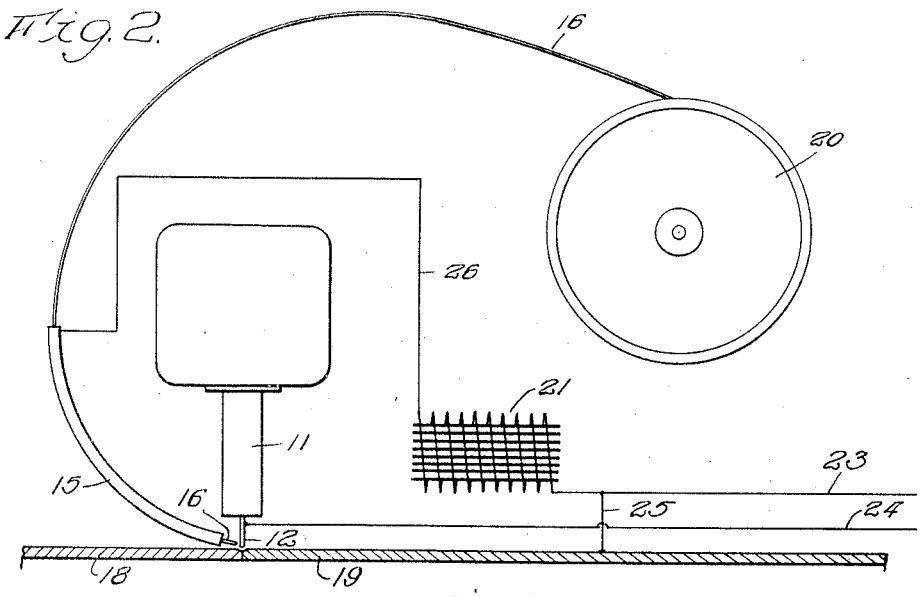
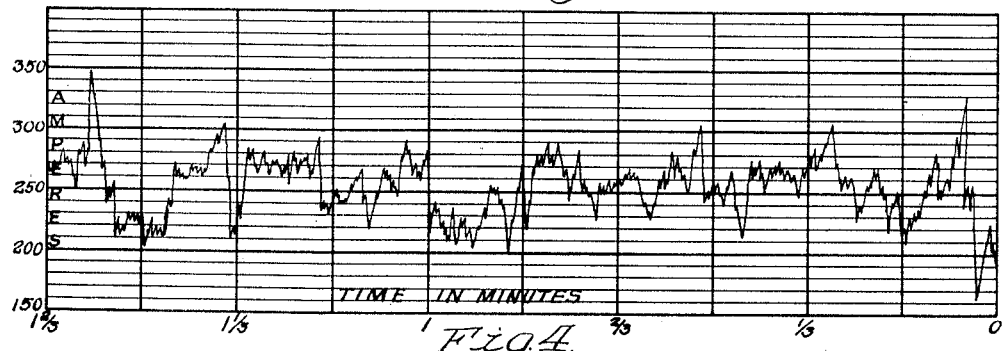
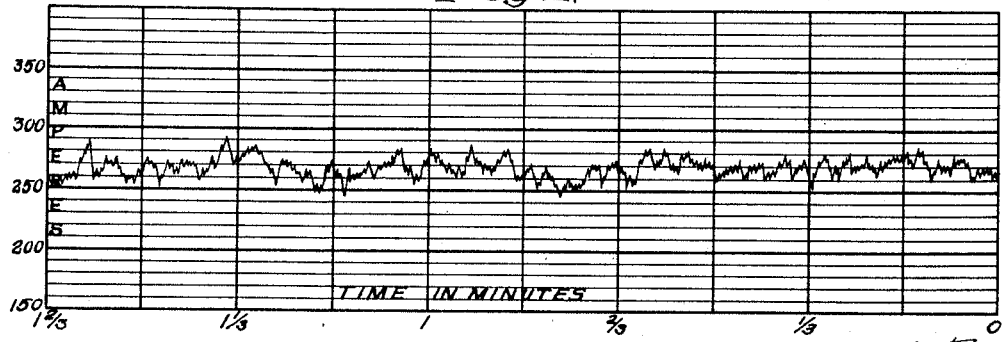
Inventor:
George R. Herman, Patented Jan. 19, 1943

2,308,510

UNITED STATES PATENT OFFICE 2,308,510

WELDING APPARATUS

George R. Herman, Chicago, Ill., assignor to Chicago Bridge & Iron Company, a corporation of Illinois Application July 18, 1941, Serial No. 403,033

6 Claims. (Cl. 219—8)

This invention relates to welding apparatus, and more particularly to apparatus for automatically welding metal members together at high speed.

One feature of this invention is that it provides improved welding apparatus; another feature is that welding speed has been substantially increased while, at the same time, welding quality has been improved; yet another feature of this invention is that both the main and secondary arcs, particularly the latter, are maintained much more stable, resulting in smoother deposit of filler rod in the weld and longer life of the electrode; other features and advantages of this invention will be apparent from the following specification and the drawings, in which:

Figure 1 is an elevational view of welding apparatus embodying my invention; Figure 2 is a schematic circuit diagram; Figure 3 is a graphic representation of the current through the filler rod in welding apparatus not embodying my invention; and Figure 4 is a graphic representation of the stabilized current through the filler rod when my invention is employed.

The welding together of the edges of metal plates or pipe sections of substantial diameter and thickness (as three-eighths of an inch) is commercially accomplished by automatic welding machinery using very heavy direct current. A main welding or heating arc is maintained between a carbon electrode and the weld point or junction of the plates, the direct current passing through this arc being in the neighborhood of 500 amperes for plates of substantial thickness; and a secondary arc is maintained between a constantly advanced filler rod and the plates, the direct current passing through this arc being in the neighborhood of half that of the main arc. Taking the welding of large steel pipe sections as an example, the maximum speed of welding with such equipment has heretofore been about twelve inches per minute, and this rate of welding was undesirably fast in that lumps and holes would be formed in the seam, and a great deal of patchwork would have to be done by hand by separate operators.

Such automatic equipment employs elaborate and expensive means for maintaining stability of the main arc, but no means has heretofore been provided for stabilizing the secondary arc through the filler rod. By providing such means my invention enables such seams to be welded at a speed in excess of sixteen inches per minute with greatly improved characteristics, the weld being smoother, deeper, and requiring practically no hand patching after the machine operation. One company employing direct current welding equipment of the kind to which I have referred previously did its welding at a rate in the neighborhood of ten inches per minute, and required the full time of two men for hand patching of the welds thereafter. Now that my invention has been employed this same company is running its welds at a rate slightly in excess of sixteen inches per minute, and requires only part time of one man for hand patching. Moreover, weld penetration has been increased twenty per cent or more despite the increase in welding speed; and carbon electrode life has now increased fifty per cent.

Referring now more particularly to the embodiment of my invention illustrated in Figure 1, a boom 10 supports a welding head 11 in which the main welding electrode 12 is carried. In accordance with conventional practice this electrode is so mounted as to be vertically movable in the head, movement being automatically effected in accordance with the voltage across the main arc to maintain this as stable as possible. The equipment for moving the carbon electrode vertically, and the associated control equipment, is conventional and readily obtainable on the market, and therefore will not be further described, other than to say that the particular one employed by me has a continuously rotating spindle and clutch arrangements for effecting desired movement of the electrode. Also associated with the welding head on the end of the boom is other conventional equipment, as the control panel 13, the flux feed tube 14, and the guide tube 15 and moving mechanism for the filler rod 16. This mechanism is appropriately driven and includes a serrated wheel 17 bearing against the filler rod and adapted to automatically move it down the guide tube as the welding progresses. The apparatus is shown in position to weld two steel pipe sections 18 and 19 together.

A supply of filler rod 16 is maintained on the reel 20, also carried by the boom. The reel is relatively freely rotatable and the drive wheel 17, therefore, moves the filler rod down through the guide tube 15 as the welding progresses, and at a rate proportionate to the rate of operation of the equipment. The principal difficulty with heavy current welding equipment has heretofore been in maintaining a proper rate of burn-off of the filler rod, so that the proper amount of metal was filled into the joint as it progressed without undesired lumps at certain points and holes at others. In order to stabilize the secondary arc or current through the filler rod I employ a heavy duty reactor here identified as 21. This reactor is preferably toroidally wound and associated with a variable contactor movable by the hand wheel 22. This enables the proper amount of inductance to be set for the desired rod current, which varies with the thickness of the material being welded and other factors.

Turning now more particularly to Figure 2, a schematic circuit diagram, the heavy direct welding current is supplied through lines indicated as 23 and 24. The line 24, through appropriate contacting means in the welding head, makes connection with the electrode 12, the connection being illustrated schematically. The other supply line 23 branches into two circuits, one branch leading to the metal members or plates being welded, here illustrated by the lead 25 connected to the plate 19; and the other branch passing through the reactor 21 and the lead 26 to the filler rod. It will be apparent that under these circumstances there will be an arc between the electrode 12 and the plates being welded, this being the main welding or heating arc; and a secondary arc between the filler rod 16 and the electrode, all current passing through the rod and this secondary arc passing through the reactor 21.

While reactors are normally used only and considered desirable only in connection with alternating current equipment, the use of the reactor 21 in series with the filler rod serves to stabilize the filler rod or secondary arc in a very desirable manner, and to result in greatly increased welding speed and greatly improved physical characteristics of the weld.

As a demonstration of the action of the reactor I have used a recording ammeter in connection with the secondary arc on equipment both with and without the reactor, the equipment otherwise being identical. Figure 3 shows the wide swings and undesired substantial variations in the secondary arc current where the equipment has no reactor, the portion of the records shown in Figure 3 being a representative part and not containing any complete breaks of current. That is, without a reactor the filler rod sometimes melts off so far back as to completely destroy the secondary arc, so that until the rod has feed down again close enough to the electrode to restart the arc there is no current flow at all in the filler rod circuit, leaving a bad hole in the weld at such a point. Figure 4 illustrates a representative portion of the current graph through the filler rod and secondary arc, the equipment being identical with that with which Figure 3 was made except for the addition of the reactor 21 in series with the filler rod. Moreover, the graph illustrated in Figure 4 was taken with the equipment operating at a welding speed of sixteen inches per minute, more difficult conditions than associated in connection with Figure 3, where the machine was operating at a welding speed of twelve inches per minute. The stabilization of current in the secondary arc is well illustrated by a comparison between these graphs.

Moreover, the use of an appropriate reactor prevents complete burn-off of the filler rod and consequent interruption of the secondary arc; results in smoother burn-off of the rod and thus smoother fill-in of the weld joint; enables the arc crater to be maintained much more evenly, eliminating pockets and irregular width in the weld; increases welding speed forty per cent or more and weld penetration approximately twenty per cent; and results in longer life of the carbon electrode, this operating cooler and more stably in the main arc as a result of stabilization of the secondary arc.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for welding metal members, including: an electrode; a filler rod; means for advancing said rod toward the welding point as welding progresses; a circuit adapted to supply direct current to the electrode to provide a main arc between it and the metal members and to supply direct current to the rod to provide a secondary arc; means for automatically varying the spacing between the electrode and the metal members to stabilize the main arc; and a reactor of substantial inductance in the portion of the circuit supplying current to the rod, through which all of the current to the rod passes.

2. Apparatus of the character claimed in claim 1, wherein the current to the rod is the only current passing through the reactor.

3. Apparatus of the character described for automatically welding the edges of metal plates together at high speed, including: an electrode; a filler rod; means for advancing said rod toward the welding point as welding progresses; a circuit adapted to supply a very heavy direct current to the electrode to provide a main arc between it and the plates and to supply a heavy direct current to the rod to provide a secondary arc; means for automatically varying the spacing between the electrode and the metal plates to stabilize the main arc; and a reactor of substantial inductance in the portion of the circuit supplying current to the rod, through which all of the current to the rod passes.

4. Apparatus of the character claimed in claim 3, wherein the current to the rod is the only current passing through the reactor.

5. Apparatus of the character described for welding metal members, including: an electrode; a filler rod; means for advancing said rod toward the welding point as welding progresses; a circuit adapted to supply direct current to the electrode to provide a main arc between it and the metal members and to supply direct current to the rod to provide a secondary arc; means for stabilizing the main arc; and means for stabilizing the secondary arc.

6. Apparatus of the character described for welding metal members, including: an electrode; a filler rod; means for advancing said rod toward the welding point as welding progresses; a circuit adapted to supply direct current to the electrode to provide a main arc between it and the metal members and to supply direct current to the rod to provide a secondary arc; means for stabilizing the main arc; and a reactor in the portion of the circuit supplying current to the rod for stabilizing the secondary arc.

GEORGE R. HERMAN.